(12) United States Patent
Naganuma

(10) Patent No.: US 12,172,516 B2
(45) Date of Patent: Dec. 24, 2024

(54) ATTACHMENT FOR FUEL INLET OF VEHICLE

(71) Applicant: TOYOTA JIDOSHA KABUSHIKI KAISHA, Toyota (JP)

(72) Inventor: Yoshiaki Naganuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/622,333

(22) Filed: Mar. 29, 2024

(65) Prior Publication Data

US 2024/0262186 A1 Aug. 8, 2024

Related U.S. Application Data

(62) Division of application No. 17/821,614, filed on Aug. 23, 2022.

(30) Foreign Application Priority Data

Aug. 25, 2021 (JP) .................................. 2021-137084

(51) Int. Cl.
*B60K 15/03* (2006.01)
*B60K 15/04* (2006.01)

(52) U.S. Cl.
CPC ........ *B60K 15/04* (2013.01); *B60K 15/03006* (2013.01); *B60K 2015/03026* (2013.01); *B60K 2015/03256* (2013.01); *B60K 2015/0467* (2013.01)

(58) Field of Classification Search
None
See application file for complete search history.

(56) References Cited

U.S. PATENT DOCUMENTS

| 4,807,665 | A | 2/1989 | Schiel |
| 5,026,255 | A | 6/1991 | Carpenter et al. |
| 8,214,129 | B2 | 7/2012 | Pursifull |
| 10,207,913 | B2 | 2/2019 | Kim et al. |
| 11,118,717 | B2 | 9/2021 | Nishio et al. |
| 2003/0134167 | A1 | 7/2003 | Hirakata |
| 2010/0108162 | A1 | 5/2010 | Nishio et al. |
| 2013/0008533 | A1 | 1/2013 | Kato et al. |
| 2014/0295305 | A1* | 10/2014 | Wake ...................... B60L 1/003 429/429 |

(Continued)

FOREIGN PATENT DOCUMENTS

| JP | 2016064836 A | 4/2016 |
| JP | 2017118694 A | 6/2017 |

OTHER PUBLICATIONS

USPTO Non-Final Office Action issued in parent U.S. Appl. No. 17/821,614 on Apr. 10, 2024.

(Continued)

*Primary Examiner* — Matthew W Jellett
(74) *Attorney, Agent, or Firm* — Hunton Andrews Kurth LLP

(57) ABSTRACT

A vehicle may include: a fuel tank; a first fuel inlet connected to the fuel tank and configured to connect to a fuel supply nozzle; and a second fuel inlet connected to the fuel tank and configured to connect to the fuel supply nozzle. An inner diameter of the second fuel inlet may be smaller than an inner diameter of the first fuel inlet.

1 Claim, 5 Drawing Sheets

(56) References Cited

U.S. PATENT DOCUMENTS

| | | | |
|---|---|---|---|
| 2014/0374417 A1* | 12/2014 | Ozaki | B60L 50/72 |
| | | | 220/86.1 |
| 2016/0083244 A1 | 3/2016 | Ogiwara et al. | |
| 2017/0159856 A1* | 6/2017 | Mitrovich | B61C 17/00 |
| 2017/0187056 A1 | 6/2017 | Kawaura et al. | |
| 2023/0068258 A1 | 3/2023 | Naganuma | |

OTHER PUBLICATIONS

WEHÂ® TK17 CNG Fueling Nozzle. Datasheet [printed online]. WEH GmbH Gas Technology, 2019. Retrieved from the internet Apr. 4, 2024 :< https://www.weh.us/weh-fueling-nozzle-tk17-cng-for-cars-ngv1-single-handed-operation-twin-hose-system-3600-psi.html>.

WEHÂ® TK17 H2 Fueling Nozzle. Datasheet [printed online]. WEH GmbH Gas Technology, 2019. Retrieved from the internet Apr. 4, 2024 :< https://www.weh.us/weh-fueling-nozzle-tk17-h-70-mpa-for-fast-filling-cars-singlehanded-operation-selfservice.html>.

USPTO Notice of Allowance issued in parent U.S. Appl. No. 17/821,614 on Aug. 5, 2024 (9 pages).

* cited by examiner

ATTACHMENT FOR FUEL INLET OF VEHICLE

CROSS-REFERENCE TO RELATED APPLICATION(S)

This is a divisional application of U.S. patent application Ser. No. 17/821,614, filed Aug. 23, 2022, which claims priority to Japanese Patent Application No. 2021-137084, filed on Aug. 25, 2021, the entire contents of which are incorporated herein by reference.

TECHNICAL FIELD

The art disclosed herein relates to a vehicle comprising a fuel inlet, and an attachment for the fuel inlet.

BACKGROUND

A vehicle includes a fuel inlet for supplying fuel to a fuel tank. A fuel cell electric vehicle also includes a fuel inlet for supplying hydrogen gas (e.g., Japanese Patent Application Publication No. 2017-118694). In the case of a fuel cell electric vehicle, a fuel inlet may in some cases be referred to as a "receptacle". In the present teachings, an opening disposed in a vehicle for supplying fuel (e.g., gasoline, diesel fuel, or hydrogen gas) will be referred to as a "fuel inlet".

SUMMARY

A conventional vehicle includes a single fuel inlet. It is expected that, in future, fuel stations will be equipped with fuel supply nozzles with a large diameter in order to shorten time required for fuel supply. In that case, there will be new fuel stations further having large-diameter fuel supply nozzles and conventional fuel stations only having small-diameter fuel supply nozzles. The present teachings provide a vehicle configured to be compatible with both a large-diameter fuel supply nozzle and a small-diameter fuel supply nozzle. Further, the present teachings provide an attachment configured to adapt a fuel supply nozzle which does not fit size-wise to a conventional vehicle having a single fuel inlet.

The vehicle disclosed herein may comprise the first fuel inlet and the second fuel inlet. The first fuel inlet and the second fuel inlet are both connected to the fuel tank, and a fuel supply nozzle extending from an outside fuel supply facility is to be connected to those inlets. An inner diameter of the second fuel inlet is smaller than an inner diameter of the first fuel inlet. In the vehicle disclosed herein, a small-diameter fuel supply nozzle can be connected to the second fuel inlet, and a large-diameter fuel supply nozzle can be connected to the first fuel inlet. The vehicle disclosed herein is configured to be compatible with both the large-diameter fuel supply nozzle and the small-diameter fuel supply nozzle.

Each of the first fuel inlet and the second fuel inlet may be disposed independently on a body of the vehicle, or a vehicle may comprise an attachment configured to be detachably attached to its first fuel inlet. An opening of the attachment on one side may be configured to connect to the first fuel inlet of the vehicle, and an opening of the attachment on another side is equipped with the second fuel inlet.

There may be a situation where the vehicle and the fuel supply nozzle (fuel supply device) communicate with each other. In that case, the vehicle may further comprise an inlet-side communication device adjacent to the first fuel inlet, the inlet-side communication device being configured to communicate with a nozzle-side communication device which the fuel supply nozzle includes. The attachment connected to the first fuel inlet may include a relay configured to relay a communication signal between the inlet-side communication device and the nozzle-side communication device.

The vehicle disclosed herein may further comprise a three-way valve connecting the first fuel inlet, the second fuel inlet, and the fuel tank. The three-way valve may be configured to close a channel for the second fuel inlet while fuel is supplied to the fuel tank through the first fuel inlet and configured to close a channel for the first fuel inlet while fuel is supplied to the fuel tank through the second fuel inlet.

The present teachings further provide an attachment for adapting a fuel supply nozzle which does not fit size-wise to a vehicle having a single fuel inlet. The attachment for fuel inlet may be have a tubular shape and configured to detachably connect to a fuel inlet of a vehicle. In the attachment, an inner diameter of an opening opposite to an opening connected to the fuel inlet may be different from an inner diameter of the fuel inlet. This attachment enables the fuel supply nozzle which is not compatible to the fuel inlet which the vehicle includes to be suitably connected to the fuel inlet.

Details of the art disclosed herein and further developments will be described in "DETAILED DESCRIPTION".

BRIEF DESCRIPTION OF DRAWINGS

DETAILED DESCRIPTION (First Embodiment) With reference to drawings, a vehicle 2 according to an embodiment will be described. FIG. 1 illustrates a plan view of a chassis 10 of the vehicle 2. In a coordinate system in the drawings, +X direction corresponds to a frontward direction of the vehicle 2, and +Z direction corresponds to an upward direction of the vehicle 2. In FIG. 1, a body 8 of the vehicle 2 is depicted in virtual lines (two-dot chain line). In FIG. 1, only a contour of the body 8 is depicted. The vehicle 2 is configured to be powered by a fuel cell 3, and run with an electric motor 4.

A frame of the chassis 10 is composed of a pair of side members 11R, 11L, and a plurality of cross members 12 connecting the pair of side members 11R, 11L. The fuel cell 3 and the electric motor 4 are fixed on the chassis 10. A battery 5 is mounted on the chassis 10. In FIG. 1, an inverter is also included in a rectangle which indicates the electric motor 4. The inverter is configured to convert DC power of the fuel cell 3 into AC power which drives the electric motor 4. The battery 5 is configured to supplement output of the fuel cell 3. The vehicle 2 is configured to generate electricity with the electric motor 4 during deceleration, and the electric power obtained by the generation charges the battery 5.

Figure 1:
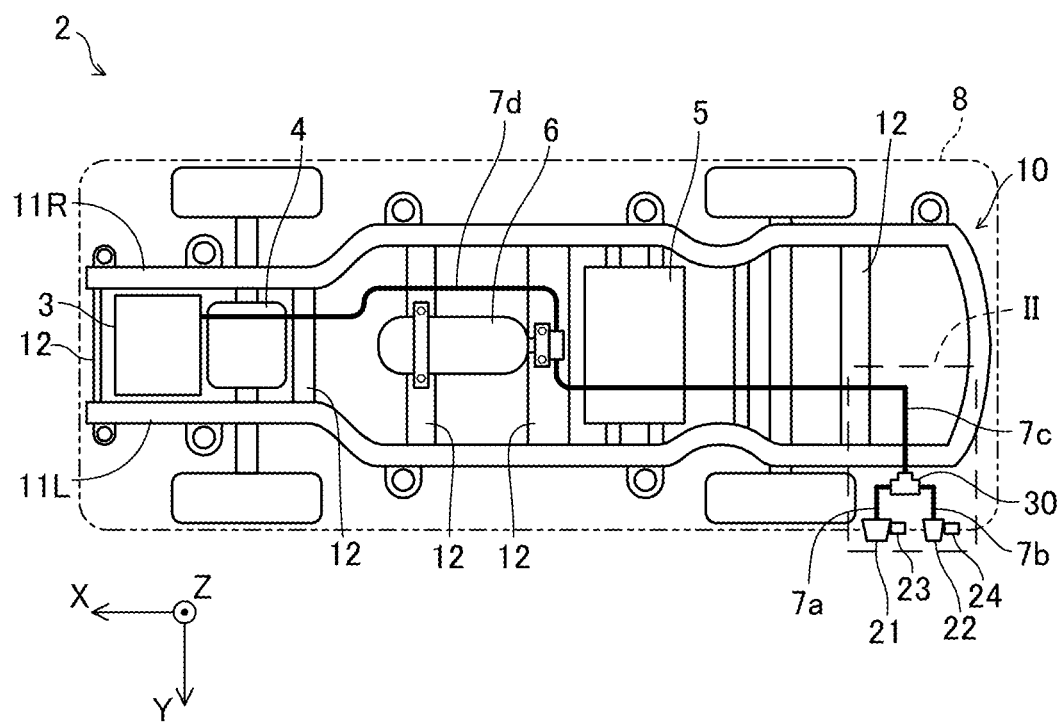
FIG. 1 illustrates a plan view of a chassis of a vehicle according to an embodiment.

A fuel tank 6 is mounted on the chassis 10. The fuel tank 6 is fixed to two of the cross members 12. Hydrogen gas is contained in the fuel tank 6. As is well known, the fuel cell 3 is configured to obtain electricity by reaction between hydrogen and oxygen (oxygen in air). Hydrogen corresponds to fuel of the fuel cell 3 (fuel of the vehicle 2).

Bold lines in FIG. 1 indicate fuel tubes. The fuel tank 6 and the fuel cell 3 are connected by a fuel tube 7d. The fuel tank 6 and a three-way valve 30 are connected by a fuel tube 7c, the three-way valve 30 and a first fuel inlet 21 are connected by a fuel tube 7a, and the three-way valve 30 and a second fuel inlet 22 are connected by a fuel tube 7b. Hereafter, the first fuel inlet 21 and the second fuel inlet 22 may be collectively referred to as "fuel inlets 21, 22".

Fuel supply nozzles, extended from an outside fuel station, is to be connected to the fuel inlets 21, 22. The vehicle 2 comprises two types of fuel inlets (i.e., first fuel inlet 21 and second fuel inlet 22). The fuel inlets 21, 22 are fixed to the body 8. Each of the fuel inlets 21, 22 is connected to the fuel tank 6 via the three-way valve 30. Hydrogen gas (fuel gas) is to be supplied to the fuel tank 6 through the three-way valve 30 from the first fuel inlet 21 or the second fuel inlet 22.

Figure 2:
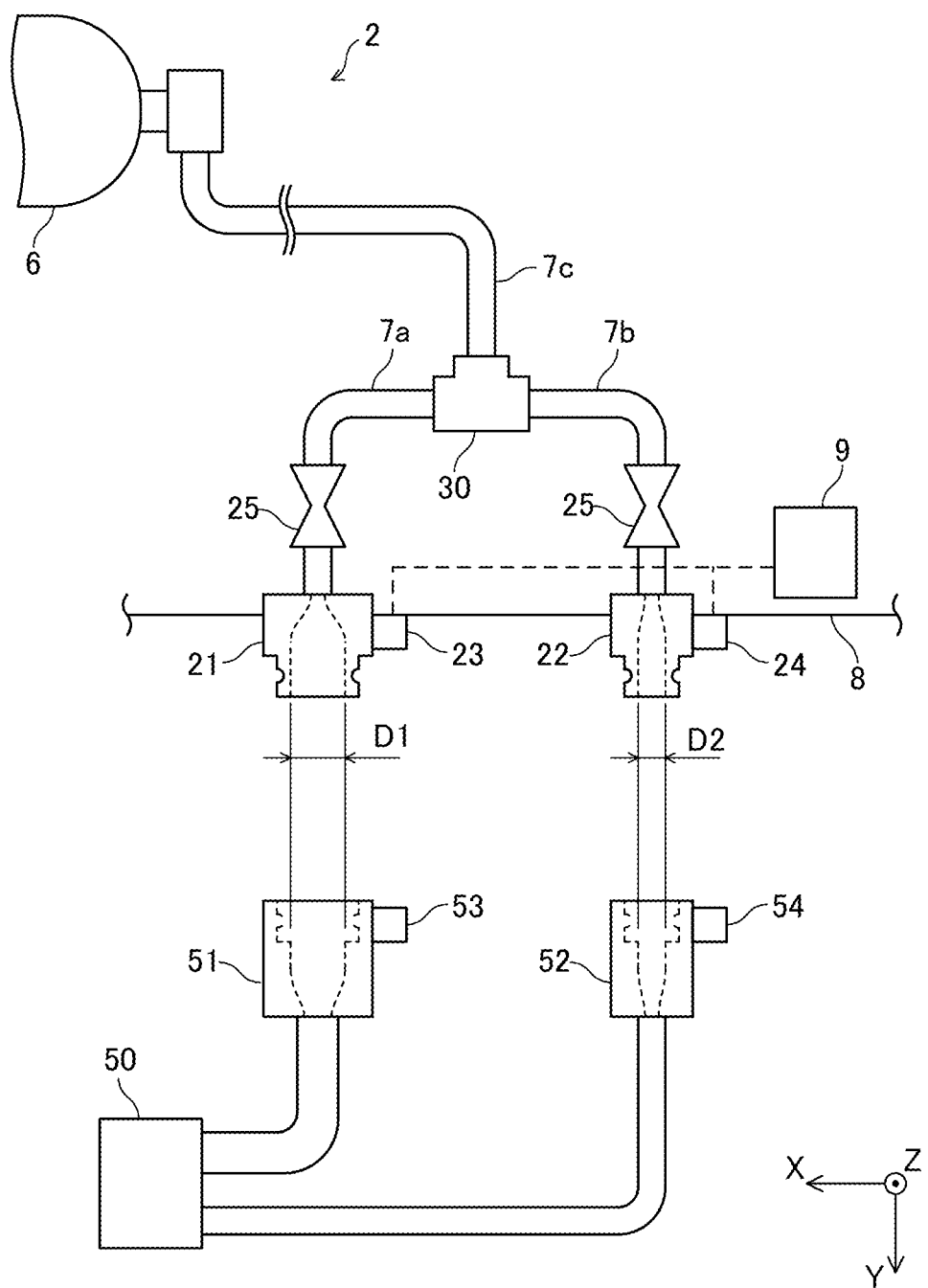
FIG. 2 illustrates an enlarged view of a region II in FIG. 1.

FIG. 2 illustrates an enlarged view of a region enclosed by a broken line II in FIG. 1. FIG. 2 also shows a fuel supply device 50 (fuel station) and fuel supply nozzles 51, 52. In FIG. 2 also, the body 8 is simplified and a part of its contour only is shown. As mentioned above, the fuel inlets 21, 22 are fixed to the body 8. A communication device 23 is arranged adjacent to the first fuel inlet 21, and another communication device 24 is arranged adjacent to the second fuel inlet 22. The communication devices 23, 24 are connected to a control device 9 of the vehicle 2. In FIG. 2, broken lines represent communication lines. The communication devices 23, 24 will be described later.

The first fuel inlet 21 and the second fuel inlet 22 are different in their inner diameters. The first fuel inlet 21 and the second fuel inlet 22 are different also in their outer diameters. The inner diameter of the first fuel inlet 21 is D1, and the inner diameter of the second fuel inlet 22 is D2. The inner diameter (D2) of the second fuel inlet 22 is smaller than the inner diameter (D1) of the first fuel inlet 21. Also, the outer diameter of the second fuel inlet 22 is smaller than the outer diameter of the first fuel inlet 21. These differences are for being compatible with two different types of fuel supply nozzles having different inner (and outer) diameters.

FIG. 2 illustrates the fuel supply device 50, and the two types of fuel supply nozzles 51, 52 are extended from the fuel supply device 50. The inner diameter of the first fuel supply nozzle 51 (inner diameter of fuel path through which fuel passes) is D1. The inner diameter of an opening of the first fuel supply nozzle 51 is equal to the outer diameter of the first fuel inlet 21. With these structures, the first fuel inlet 21 is configured to allow the first fuel supply nozzle 51 to be connected thereto.

The inner diameter of the second fuel supply nozzle 52 (inner diameter of fuel path through which fuel passes) is D2. Further, the inner diameter of an opening of the second fuel supply nozzle 52 is equal to the outer diameter of the second fuel inlet 22. With these structures, the second fuel inlet 22 is configured to allow the second fuel supply nozzle 52 to be connected thereto.

Since the first fuel supply nozzle 51 has a flow path with the inner diameter greater than that of the second fuel supply nozzle 52, a flow amount of the first fuel supply nozzle 51 is greater than a flow amount of the second fuel supply nozzle 52. That is, time required for supplying fuel is shorter when the first fuel supply nozzle 51 is used than when the second fuel supply nozzle 52 is used. This advantage is especially effective when fuel is supplied to a vehicle with a large-capacity fuel tank mounted therein. It is also advantageous that the time required for supplying fuel is short even when the fuel tank is small.

Some fuel stations are equipped with only fuel supply nozzles having the large diameter (inner diameter=D1), while other stations are equipped with only fuel supply nozzles having the small diameter (inner diameter=D2). The vehicle 2 according to the embodiment is configured to be compatible with both the large-diameter fuel supply nozzles (inner diameter=D1) and the small-diameter fuel supply nozzles (inner diameter=D2).

A fuel supply nozzle (fuel supply device 50) may be configured to communicate with the control device 9 of the vehicle 2. Communication is performed for the fuel supply device 50 to confirm that the fuel supply nozzle has been connected to the fuel inlet, and/or to inform a fill level of fuel in the fuel tank 6 to the fuel supply device 50. A communication device 53(54) on a fuel supply device 50 side is included in the first fuel supply nozzle 51 (second fuel supply nozzle 52). The communication device 23 (24) is arranged adjacent to the first fuel inlet 21 (second fuel inlet 22). The nozzle-side communication device 53 (54) and the inlet-side communication device 23 (24) are configured to perform infrared communication. When the first fuel supply nozzle 51 (second fuel supply nozzle 52) is connected to the first fuel inlet 21 (second fuel inlet 22), the communication device 53 (54) and the communication device 23 (24) come close to each other and also face each other, and become ready to communicate with each other. The fuel supply device 50 and the control device 9 of the vehicle 2 are configured to communicate with each other via the communication devices 23 and 53 (or communication devices 24 and 54).

Communication devices are suitable especially for filling gaseous fuel, in particular. This is because, in the case of the gaseous fuel, a check valve is typically included in a fuel tube, which makes it impossible to know the amount of fuel gas stored in the fuel tank by seeing through the fuel inlet. The vehicle 2 of the embodiment is a fuel cell electric vehicle which uses hydrogen gas as the fuel, and thus the hydrogen gas is stored in the fuel tank 6. A check valve 25 is arranged in the fuel tube 7a (7b), which connects the fuel inlet 21 (22) and the three-way valve 30, by which the fuel gas (hydrogen gas) does not flow back to the fuel inlet 21 (22) from the fuel tank 6.

Figure 3:
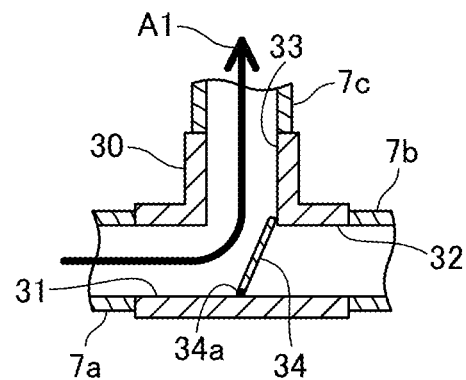
FIG. 3 illustrates a cross-sectional view of a three-way valve (when fuel is supplied from a first fuel inlet).
Figure 4:
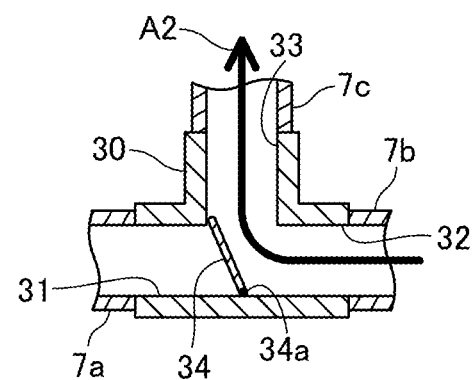
FIG. 4 illustrates a cross-sectional view of the three-way valve (when fuel is supplied from a second fuel inlet).

An example for a structure of the three-way valve 30 will be described with reference to FIGS. 3 and 4. FIGS. 3 and 4 are each a cross-sectional view of the three-way valve 30. The three-way valve 30 has three flow paths that are in communication with each other. A first flow path 31 is connected to the first fuel inlet 21 via the fuel tube 7a, a second flow path 32 is connected to the second fuel inlet 22 via the fuel tube 7b, and a third flow path 33 is connected to the fuel tank 6 via the fuel tube 7c. FIG. 3 shows when fuel is supplied from the first fuel inlet 21. A swing valve body 34 configured to close either the first flow path 31 or the second flow path 32 is arranged inside the three-way valve 30. The swing valve body 34 is configured to swing around a pivot 34a. When the fuel is supplied from the first fuel inlet 21 (first flow path 31), the swing valve body 34 is pushed by pressure of the fuel and closes the second flow path 32 on the opposite side. Since the second flow path 32 is closed, the fuel does not leak from the second fuel inlet 22 while the fuel is being supplied through the first fuel inlet 21.

FIG. 4 shows when the fuel is supplied from the second fuel inlet 22. When the fuel is supplied from the second fuel inlet 22 (second flow path 32), the swing valve body 34 is pushed by the pressure of the fuel, and closes the first flow path 31 on the opposite side. Since the first flow path 31 is closed, the fuel does not leak from the first fuel inlet 21 while the fuel is being supplied from the second fuel inlet 22.

Figure 5:
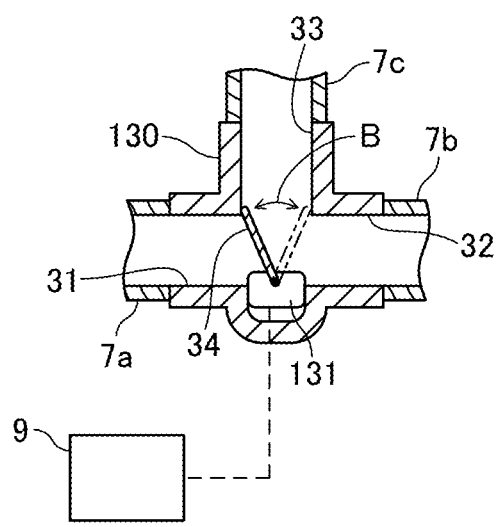
FIG. 5 illustrates a cross-sectional view of a three-way valve according to a variant.

FIG. 5 shows a cross-sectional view of a three-way valve 130 of a variant. A swing valve body 34 of the three-way valve 130 is configured to swing by an actuator 131. The actuator 131 is connected with the control device 9 via communication line. As mentioned above, the control device 9 is configured to communicate also with the communication devices 23, 24 which the fuel inlets 21, 22 include. The control device 9 is configured to detect that a fuel supply nozzle has been connected to the first fuel inlet 21 or the second fuel inlet 22. When the control device 9 detects that the first fuel supply nozzle 51 has been connected to the first fuel inlet 21, the control device 9 controls the actuator 131 for the swing valve body 34 to close the second flow path 32. On the other hand, when the control device 9 detects that the second fuel supply nozzle 52 has been connected to the second fuel inlet 22, the control device 9 controls the actuator 131 for the swing valve body 34 to close the first flow path 31. Also with the three-way valve 130 in which the swing valve body 34 operates by the actuator 131 and the control device 9, fuel leak from a fuel inlet to which no fuel supply nozzle is connected can be suppressed.

Figure 6:
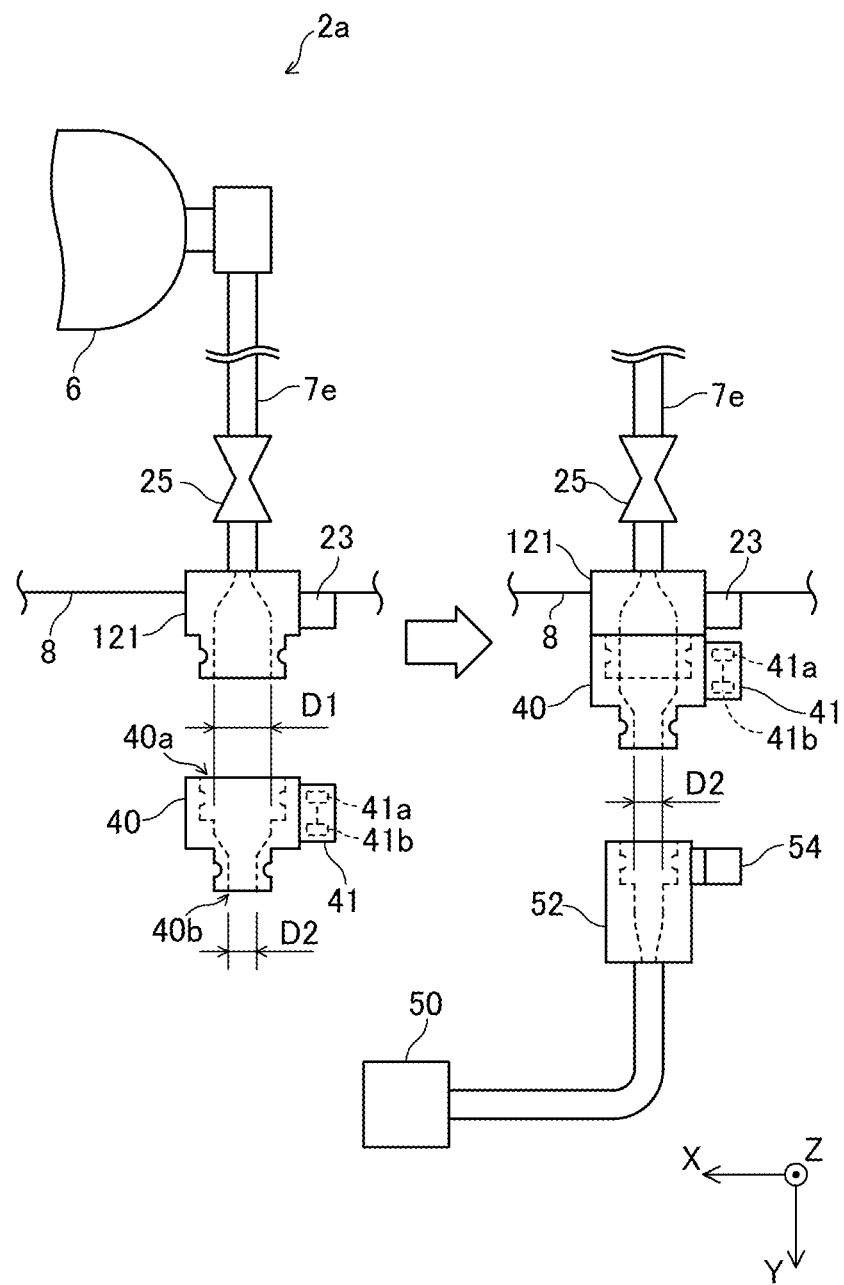
FIG. 6 illustrates a plan view of an attachment for a fuel inlet.

(Second Embodiment) FIG. 6 is a partial plan view of a vehicle 2a. The vehicle 2a comprises a fuel tank 6 and a fuel inlet 121, and FIG. 6 depicts a plan view of a part of the fuel tank 6, and surroundings of the fuel inlet 121.

The vehicle 2a comprises only the fuel inlet 121. An inner diameter of the fuel inlet 121 is D1, and is the same as the inner diameter of the first fuel inlet 21 of the vehicle 2 according to the first embodiment. The fuel inlet 121 and the fuel tank 6 are connected by a fuel tube 7e, and a check valve 25 is arranged in the fuel tube 7e. An outer diameter of the fuel inlet 121 is the same as the outer diameter of the first fuel inlet 21. Accordingly, the fuel inlet 121 is configured to allow the first fuel supply nozzle 51 of FIG. 1 to be connected thereto.

The vehicle 2a and/or a fuel station are equipped with an attachment 40 for a fuel inlet. The attachment 40 is a tube having openings on both ends. An opening 40a on the one side is configured to be coupled with the fuel inlet 121 of the vehicle 2a. An inner diameter of the opening 40a is D1, which is the same as the inner diameter of the fuel inlet 121. An inner diameter of an opening 40b on the other side is D2. The other side opening 40b has a structure which allows the second fuel supply nozzle 52 (inner diameter D2) to be connected thereto.

The attachment 40 includes a communication relay 41. The communication relay 41 includes an inlet-side communication device 41a and a nozzle-side communication device 41b. A right side of FIG. 6 shows a state where the attachment 40 is attached to the fuel inlet 121. With the attachment 40 connected to the fuel inlet 121, the communication device 23 of the vehicle 2a and the inlet-side communication device 41a of the communication relay 41 of the attachment 40 face each other. The communication device 23 and the inlet-side communication device 41a are of infrared communication type, and they are configured to communicate with each other by being close to and facing each other.

With the second fuel supply nozzle 52 connected to the other side opening 40b of the attachment 40, the nozzle-side communication device 54 and the nozzle-side communication device 41b of the communication relay 41 of the attachment 40 face each other. The communication device 54 and the nozzle-side communication device 41b are also of infrared communication type, and they are configured to communicate with each other by being close to and facing each other.

The inlet-side communication device 41a sends a communication signal received from the communication device 23 to the nozzle-side communication device 41b. The nozzle-side communication device 41b dispatches the communication signal received from the inlet-side communication device 41a to the communication device 54. On the other hand, the nozzle-side communication device 41b sends a communication signal received from the communication device 54 to the inlet-side communication device 41a. The inlet-side communication device 41a dispatches the communication signal received from the nozzle-side communication device 41b to the communication device 23.

The communication relay 41 is configured to relay a communication signal between the communication device 23 on the fuel inlet 121 side and the nozzle-side communication device 54. By the communication relay 41 being arranged between the inlet-side communication device 23 and the nozzle-side communication device 54, the communication device 23 (that is, the control device 9 of the vehicle 2a) and the communication device 54 (that is, the fuel supply device 50) are configured to communicate with each other. By the vehicle 2a and/or the fuel station being equipped with the attachment 40, the vehicle 2a is configured to allow both fuel supply nozzles of two types with different diameters (i.e., first fuel supply nozzle 51 and second fuel supply nozzle 52) to be connected to the vehicle 2a.

Some of points to be noted regarding the art disclosed in the embodiments will be described. The first fuel inlet 21 has the structure which allows the large-diameter first fuel supply nozzle 51 to be connected thereto. Specifically, the inner diameter of the first fuel inlet 21 is the same as the inner diameter of the internal flow path of the first fuel supply nozzle 51, and the outer diameter of the first fuel inlet 21 is the same as the inner diameter of the opening of the first fuel supply nozzle 51. The first fuel inlet 21 has a side surface comprising recess(es) configured to fit with projection(s) and/or pawl(s) arranged on an inner side surface of the first fuel supply nozzle 51.

Similarly, the second fuel inlet 22 has the structure which allows the small-diameter second fuel supply nozzle 52 to be connected thereto. The inner diameter of the second fuel inlet 22 is the same as the inner diameter of the internal flow path of the second fuel supply nozzle 52, and the outer diameter of the second fuel inlet 22 is the same as the inner diameter of the opening of the second fuel supply nozzle 52. The second fuel inlet 22 has a side surface comprising recess(es) configured to fit with projection(s) and/or pawl(s) arranged on an inner side surface of the second fuel supply nozzle 52.

The attachment 40 has the inner diameter on the fuel inlet 121 side greater than the inner diameter on the opposite side. That is, the fuel inlet 121 is configured to allow the large-diameter first fuel supply nozzle 51 to be connected thereto. With the attachment 40 attached to the fuel inlet 121, the fuel inlet 121 is enabled to allow the small-diameter second fuel supply nozzle 52 to be connected thereto. Since the fuel inlet 121 is configured capable of receiving a greater amount of fuel, the fuel would not overflow even if the fuel is supplied when the small-diameter second fuel supply nozzle 52 is connected to the fuel inlet 121 (via the attachment 40).

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present description or drawings is to satisfy multiple objectives simultaneously, and satisfying any one of those objectives gives technical utility to the present disclosure.

What is claimed is:

1. An attachment having a tubular shape and configured to be detachably connected to a fuel inlet of a vehicle, the vehicle having an inlet-side communication device adjacent to the fuel inlet, the inlet-side communication device being configured to communicate with a nozzle-side communication device of a first fuel supply nozzle when the first fuel supply nozzle is connected to the fuel inlet, and the attachment comprising:
   a first opening at one end of the tubular shape with a first diameter connectable to the fuel inlet;
   a second opening at an opposite end of the tubular shape with a second diameter connectable to a second fuel supply nozzle, wherein a nozzle opening size of the second fuel supply nozzle is different from a nozzle opening size of the first fuel supply nozzle; and
   a relay configured to relay a communication signal between the inlet-side communication device and a nozzle-side communication device of the second fuel supply nozzle when the attachment is connected between the fuel inlet and the second fuel supply nozzle.

* * * * *